(12) United States Patent
Naohara et al.

(10) Patent No.: US 6,604,264 B1
(45) Date of Patent: *Aug. 12, 2003

(54) FEMALE ENGAGING MEMBER OF SURFACE FASTENER AND PRODUCTION APPARATUS THEREOF

(75) Inventors: Masayuki Naohara, Toyama-ken (JP); Mitsuru Akeno, Toyama-ken (JP); Hissai Nishiyama, Toyama-ken (JP)

(73) Assignee: YKK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/639,074

(22) Filed: Aug. 16, 2000

(30) Foreign Application Priority Data

Aug. 27, 1999  (JP) ......................................... H11-241804

(51) Int. Cl.[7] .............................................. A44B 18/00
(52) U.S. Cl. ............................. 24/444; 24/448; 24/450; 24/446
(58) Field of Search .......................... 24/442, 446, 444, 24/451, 447, 448, 450; 428/92–95, 99, 100; 604/391

(56) References Cited

U.S. PATENT DOCUMENTS

| 4,725,473 A | * | 2/1988 | Van Gompel et al. |
| 4,761,318 A | * | 8/1988 | Ott et al. |
| 5,256,231 A | * | 10/1993 | Gorman et al. |
| 5,512,234 A | | 4/1996 | Takizawa et al. |
| 5,615,460 A | * | 4/1997 | Weirich et al. |
| 5,669,120 A | | 9/1997 | Wessels et al. |
| 5,699,593 A | * | 12/1997 | Jackson |
| 5,830,298 A | | 11/1998 | Jackson |
| 5,888,607 A | * | 3/1999 | Seth et al. |
| 5,974,635 A | | 11/1999 | Murasaki |
| 5,981,027 A | * | 11/1999 | Parellada |
| 5,997,981 A | * | 12/1999 | McCormack et al. |

FOREIGN PATENT DOCUMENTS

| EP | 895731 A2 | * | 2/1999 |
| JP | 2-191735 | | 7/1990 |

* cited by examiner

Primary Examiner—James R. Brittain
(74) Attorney, Agent, or Firm—Finnegan, Henderson, Farabow, Garrett & Dunner, L.L.P.

(57) ABSTRACT

A multiplicity of pile-like engaging elements are fused integrally with top faces of each of elevated portions formed on a first surface of a flat plate-like substrate comprised of the first surface and a second surface such that more than ¼ of cross sectional areas of the entangled yarn are buried therein. The entangled yarns are fused integrally with the elevated portions firmly due to existence of the elevated portions regardless of a certain thickness of the flat plate-like substrate. In the meantime, it is permissible to form covering portions for covering the entangled yarn locally with component material of the flat plate-like substrate instead of the elevated portions. As a result, the female engaging member can be produced continuously without increase of equipment cost and the like. Further, a sufficient fixing strength can be provided to pile yarn rows bonded and fixed to the substrate surface although the pile yarns are fixed by fusion of the flat plate-like substrate. Therefore, a high productivity can be secured. A production apparatus is also provided for realizing such a female engaging member.

10 Claims, 12 Drawing Sheets

FEMALE ENGAGING MEMBER OF SURFACE FASTENER AND PRODUCTION APPARATUS THEREOF

BACKGROUND OF THE INVENTION

1. Field of the Invention

The present invention relates to a female engaging member for surface fastener having a plurality of fiber piles on a surface of a flat plate-like substrate made of thermoplastic synthetic resin. It also relates to a production method thereof.

2. Description of the Related Art

Generally, a surface fastener is comprised of a male engaging member having a plurality of male engaging elements formed in the shape of a hook, mushroom or other configuration on the surface of a flat plate-like substrate and a female engaging member having a plurality of pile-like female engaging elements on a surface of a flat plate-like substrate. By pressing both the flat plate-like substrates with the male engaging elements and female engaging elements opposing each other or peeling them from each other, the engaging elements are engaged with each other or disengaged from each other through their entire surfaces. Thus, this surface fastener is used for engaging or disengaging two structure members with or from each other. Further, in some case, the aforementioned male and female engaging elements may be mixedly formed on the same surface of a flat plate-like substrate or may be formed on front and rear surfaces of a flat plate-like substrate respectively, so as to be used various types of a fastening device.

As configuration of the male engaging element, hook shape, mushroom shape, palm tree shape and the like are currently used. One of the typical types is produced by knitting or weaving monofilaments in fabric structure simultaneously with producing the same fabric structure such as knitted fabric structure and woven fabric structure and then cutting out part of the monofilaments. Alternatively, it may be produced by rotating a die wheel having a plurality of engaging-element-molding cavities on its peripheral face in one direction, and introducing molten resin material to the peripheral face of the die wheel so as to mold a flat plate-like substrate and engaging elements integrally and continuously.

On the other hand, the aforementioned female engaging member is generally produced in the form of dense fabric made piles. As the most typical female engaging member, a multiplicity of fabric piles are formed densely on a surface of a flat plate-like substrate composed of fabric knitted cloth, unwoven fabric or synthetic resin sheet. This fabric piles are generally formed by knitting or weaving at the same time when fabric substrate such as knitted cloth is produced. Alternatively, it is automatically produced when unwoven cloth is produced. U.S. Pat. No. 5,512,234, for example, discloses a case that the aforementioned flat plate-like substrate is composed of synthetic resin sheet to form piles on a surface thereof. In this known method, the synthetic resin sheet is molded integrally with male engaging elements and a multiplicity of long fabric yarn rows that are arranged in parallel are introduced to a peripheral face of a heating drum having a multiplicity of loop molding concave portions on the peripheral face and then, the fabric yarn rows are bent to loop shapes inside of the aforementioned loop molding concave portions. Then, the bent fabric yarn rows are continuously joined to the aforementioned synthetic resin sheet. Finally, base portions of the loops that are formed of the long fabric yarn rows are fixed integrally to the surface of the synthetic resin sheet by fusion.

Further, as disclosed by for example, Japanese Patent Laid-Open Publication No. 63-63405, it is known that a surface of thermoplastic synthetic resin sheet is softened and a fabric structure composed of knitted cloth or unwoven cloth having a multiplicity of piles is pressed to the softened surface and fixed integrally thereto. Because part of the softened synthetic resin sheet invades into the fabric structure to be integrated therewith, the configuration of the piles is stabilized thereby eliminating the necessity of back coating. According to, for example, Japanese Patent Laid-Open Publication No. 2-191735, multifilaments of two kinds having a difference in melting point are fed to an air temporary twisting apparatus at different feeding speeds to cover a core string with a multiplicity of loops. As a result, a heat-set covered string is produced. Plural pieces of the covered strings are arranged together and placed on a surface of a sheet composed of unwoven cloth or the like. Then, by carrying out heat processing at a temperature higher than a melting point of the low-melting-point multifilament and lower than a melting point of the high-melting-point multifilament, the low-melting-point multifilament is fused to the aforementioned sheet so that the male engaging member is produced.

The female engaging member similar to the technology disclosed in the Japanese Patent Laid-Open Publication NO. 2-191735 is disclosed in for example, U.S. Pat. No. 5,699, 593 and U.S. Pat. No. 5,830,298. In the female engaging member disclosed in these specifications, multifilaments having a multiplicity of piles on a surface of a substrate sheet made of synthetic resin film are integrated intermittently to the surface in a length direction of the multifilaments by bonding with adhesive agent, melting together using base material or fusion with ultrasonic wave.

Further, Japanese Patent Laid-Open Publication NO. 11-46811 discloses a female engaging member in which pile yarn rows composed of a multiplicity of filaments wound around a core string are bonded integrally to a surface of a flat plate-like substrate. This female engaging member also can be produced continuously by a simple operation. A length of one winding of the filaments around the core string is set to be larger than a round of the core string. Further, when the pile yarn rows are fixed to the surface of the flat plate-like substrate, a distance of maximum portion between a peripheral face of the aforementioned core string and an inner circumferential face of the filament is set to be 0.1 mm$\leq$D$\leq$5 mm. As a result, piles of various sizes can be produced arbitrarily and easily thereby leading to an expansion of application field of the engaging member.

However, according to the production method of the female engaging member as disclosed in the aforementioned U.S. Pat. No. 5,512,234, if tension control upon feeding the multiplicity of the multifilaments as being supplied in parallel to the drum is not carried out at high accuracy, bending of the filaments equally in zigzag shape is difficult. Further, in order to fix the same filaments to the surface of the synthetic resin sheet stably with the shapes of the loops being maintained, synchronous driving between multiple operating portions have to be controlled at high accuracy, thereby increasing production cost. Furthermore, this method is troublesome because an expensive drum has to be changed or for the other reasons. Thus, the kinds of the product are limited and application field of the product is limited, therefore there is no possibility for development.

According to the female engaging member as disclosed in the aforementioned Japanese Patent Laid-Open Publication No. 63-63405, thermoplastic resin sheet exists on an entire back surface of the fabric structure instead of back coating. Further, part the resin sheet invades an entire face of the fabric structure so as to be fused integrally therewith. Thus, stiffness increases on the boundary, in addition to the existence of the thermoplastic resin sheet, so that it is difficult to secure flexibility.

According to the female engaging member as disclosed in the aforementioned Japanese Patent Laid-Open Publication No. 63-63405, as described in its specification, the multifilaments of two kinds having a difference in melting point which are substantially untwisted are arranged together and passed through swirling air flow to be entangled with the others at random, which is called "temporary twisting" by swirling air flow. Then, these filaments are heat set and then the multifilaments of low melting point are fused at a substantially middle temperature between the two melting points to be fused integrally to the substrate sheet (cover). Upon this fusion, part of the low-melting-point multifilaments are fused and fixed to the substrate sheet. Further, the low-melting-point multifilaments are entangled with the high-melting-point multifilaments and the low-melting-point multifilaments are melted to be liquefied so that the melted resin is likely to gather at entangling points of the multifilaments and the high-melting-point multifilaments are fused together and integrated at the entangling points.

Therefore, the size of the formed pile of the high-melting-point multifilaments decreases so that a range in which piles cannot engage mating male engaging elements is increased. As a result, the piles may not function as a female engaging elements of a surface fastener. Further if it is intended to secure a function as the engaging element when the multifilaments are fused together at the aforementioned entangling points, it is necessary to set up a number of production conditions strictly to obtain the aforementioned entangled yarns composed of the multifilaments of two kinds. Therefore, its maintenance is not easy.

In case of the female engaging member as disclosed in the aforementioned U.S. Pat. No. 5,699,593 and U.S. Pat. No. 5,830,298, an adhesive agent application unit, ultrasonic wave fusing machine or the like are necessary to be installed in order to bond the multifilament yarn rows to the substrate surface or fuse them with ultrasonic wave, thereby leading to increases of equipment cost and space. Further, when the multifilament yarn rows are fused intermittently to a substrate in molten state, if the thickness of the substrate is small, fused portions appear on the back of the substrate, which is not tolerable to be used as a product. Alternatively, if the thickness of the substrate is large, the multifilament yarn rows tend to be separated from the substrate too easily if they are fused in such a simple manner.

This is the same for the female engaging member as disclosed in the aforementioned Japanese Patent Laid-Open Publication No. 11-46811, in which not only the filaments composing the piles but also the core string tend to be separated too easily from the substrate surface. For actual use, therefore, further improvements are necessary.

SUMMARY OF THE INVENTION

Accordingly, the present invention has been achieved to solve the above described problems. Therefore, an object of the invention is to provide a female engaging member of a surface fastener which can be produced continuously without an increase of equipment cost or the like, and in which a sufficient fixing strength can be provided to pile yarn rows which are bonded and fixed to a surface of flat plate-like substrate although the pile yarn rows are fixed by fusion of the substrate and a high productivity is secured, and a production apparatus,therefor.

Such an object is achieved by a female engaging member according to first to twelfth aspects of the invention and a production apparatus according to thirteenth to twenty third aspects of the invention.

According to a first aspect of the present invention, there is provided a female engaging member of a surface fastener comprised of a flat plate-like substrate having a first surface and a second surface and a multiplicity of pile-like engaging elements on the first surface, and adapted to be in a plane contact with a mating male engaging member of the surface fastener, characterized in that said pile-like engaging elements are comprised of rows of multifilament entangled yarns having a multiplicity of loops on surfaces thereof, multiple rows of elevated portions are provided to extend so as to extend on the first surface of said flat plate-like substrate, said entangled yarns are fused integrally with top faces of said elevated portions such that ¼ or more of cross sectional areas of said entangled yarns are buried therein.

By providing the elevated portion so as to be extend on the first surface of the flat plate-like substrate, the respective entangled yarns can be fused integrally with a sufficient amount of the molten resin material of the elevated portions which is part of the component material of the substrate, without changing a substantial thickness of the substrate. Thus, even if the entangled yarns are locally fixed to the flat plate-like substrate, fixing strength of the entangled yarns with respect to the flat plate-like substrate can be increased remarkably. To secure the fixing strength sufficiently, the entangled yarns have to be fused such that ¼ more of cross sectional areas thereof are buried in the elevated portions. If the buried portions are less than the ¼ of the cross sectional areas, the entangled yarns are likely to be separated from the flat plate-like substrate relatively easily when the female engaging member is disengaged from a mating male engaging member.

Preferably, a multiplicity of rows of the elevated portions are provided on the first surface of the flat plate-like substrate so as to extend parallel in a length direction thereof and the entangled yarns extend along the top faces of the elevated portion and are locally pressed at a predetermined interval in the length direction or pressed along the entire lengths so that the entangled yarns are fused integrally with the elevated portions.

Further preferably, a plurality of rows of the elevated portions are provided on the first surface of the flat plate-like substrate so as to extend parallel in a length direction thereof and the entangled yarns are disposed on top faces of the elevated portions such that they meander and crossing portions of the entangled yarns with the elevated portions are pressed locally so as to be fused integrally with the elevated portions. With such a structure, an engaging region with a mating male engaging member increases and the orientation of the engagement is not uniform, so that the engagement is carried out entirely by the first surface of the flat plate-like substrate.

Further preferably, a multiplicity of the elevated portions are disposed so as to extend on the first surface of the flat plate-like substrate such that they meander and said entangled yarns cross upper the upper surface portions at crossing portions where the entangled yarns are locally pressed so as to be fused integrally with the elevated portions. In this case, the multiplicity of rows of the elevated portions are disposed such that they meander on the first surface of the flat plate-like substrate. Thus, the flat plate-like substrate is never torn easily even if the thickness thereof is small.

According to a fifth aspect of the present invention, a multiplicity of rows of parallel elevated portions are disposed on the first surface of the flat plate-like substrate in a width direction thereof, the entangled yarns are disposed on the first surface perpendicular to the elevated portions and the entangled yarns are fused integrally with the elevated portions at crossing portions therebetween such that ¼ or more of cross sectional areas of the entangled yarns are buried therein.

That is, according to this aspect, the multiplicity of rows of the elevated portion are disposed in a width direction thereof such that they extend in parallel in the length direction of the flat plate-like substrate, and the multiplicity of rows of the entangled yarns are disposed to extend in parallel in the width direction of the flat plate-like substrate and perpendicular to the respective elevated portions. At the crossing portions, each row of the entangled yarns is fused integrally such that ¼ or more of the cross sectional areas are buried in the elevated portions. Thus, the fixing strength of the entangled yarns with respect to the flat plate-like substrate is increased. Therefore, even when the female engaging member is disengaged from the mating male engaging member, the entangled yarns are never separated from the flat plate-like substrate.

According to a sixth aspect of the present invention, a multiplicity of rows of the entangled yarns are disposed in parallel in a length direction of the first surface of the flat plate-like substrate, and a multiplicity of protrusion rows made of the same resin material as the flat plate-like substrate are provided at a predetermined interval so as to protrude on the first surface of the flat plate-like substrate along each row of the entangled yarns. The rows of the entangled yarns are fused integrally with the protrusion rows such that ¼ or more of cross sectional areas of the entangled yarns are buried therein. In this case, the fixing strength of the entangled yarns with respect to the flat plate-like substrate is very high as the female engaging member according to the above-mentioned fifth aspect and further, the flexibility of the flat plate-like substrate is never spoiled.

According to a seventh aspect of the present invention, there is provided a female engaging member having a quite different fixing structure of the entangled yarns with respect to the flat plate-like substrate sheet. Through holes are formed in the flat plate-like substrate to be in a matrix, and a multiplicity of the entangled yarns are disposed in parallel along each row of the through holes arranged in a length direction of the first surface. An adhesive agent layer is formed on a second surface on an opposite side to the first surface of the flat plate-like substrate so that component adhesive agent of the adhesive agent layer is fused integrally with the entangled yarns locally through the through holes.

In recent years, adhesive agent is applied to the second surface of this kind of the female engaging member and a released paper is bonded thereto. Upon use, this released paper is peeled off and the female engaging member is bonded to an object to be engaged or disengaged. According to this aspect of the present invention, using adhesive agent coated on the second surface of the flat plate-like substrate, the adhesive agent is passed through the through holes when it is coated, whereby the entangled yarns disposed on the first surface are locally bonded to the flat plate-like substrate.

The entangled yarns to be applied to the female engaging member having such a structure may be composite finished yarns made by air jet processing using two or more multifilaments having different feeding speeds, bulky crimped finishing yarns made by air jet processing and made of highly crimped multifilaments or bulky thermal shrinkage yarns by air jet processing and composed of two or more multifilaments having different thermal shrinkage rates.

In addition to the structure described above, male engaging elements may be molded on the second surface which is on an opposite side to the first surface, or the male engaging elements may be molded also on the first surface together with the female engaging elements. The female engaging member having such a structure not only exerts its function as a female engaging member, but also has a self-engaging performance, so that it can be used as various kinds of fastening devices or banding devices.

Thirteenth to twenty third aspects of the invention relate to production apparatuses for the female engaging member having the above described structures.

According to a thirteenth aspect of the present invention, there is provided a production apparatus for producing the female engaging member of a surface fastener according to the second aspect of the present invention, characterized by comprising: a die wheel rotating in one direction; an extrusion nozzle having an opposing face opposing a peripheral face of said die wheel with a predetermined gap and having an extruding port provided on part of said opposing face to extrude molten resin; a yarn guiding member for supplying and guiding said entangled yarns to the peripheral face of the die wheel located in a downstream of said extruding nozzle in the rotation direction of said die wheel; and a pressing roll for pressing the entangled yarns supplied to the peripheral face of said die wheel against the peripheral face of the die wheel, wherein arcuated grooves of a number corresponding to that of said entangled yarns are provided to extend in parallel in the peripheral direction in the opposing face of said extruding nozzle located in a downstream of the extruding port in the rotation direction of the die wheel, and a plurality of protrusion rows extending parallel to an axial direction of the pressing roller having such a sufficient height that ¼ or more of cross sectional areas of said entangled yarns are buried in said elevated portions are provided in the peripheral face of the pressing roll so as to protrude with a predetermined phase difference.

The molten resin material is extruded from a substantially rectangular extruding port which is longer in a width direction of the extrusion nozzle to a smooth surface of the die wheel rotating in one direction and then rotated between the die wheel and the opposing face of the extruding nozzle in accordance with the rotation of the die wheel. At this time, the molten resin material extruded from the extrusion nozzle invades into the multiplicity of the arcuated grooves formed on the opposing face of the extrusion nozzle. Thus, a flat plate-like substrate is molded on the peripheral face of the die wheel, and at the same time, multiple rows of continuous elevated portions are molded integrally on the first surface of the substrate such that they extend in the rotation direction of the die wheel.

On the other hand, a multiplicity of the entangled yarns guided in parallel by the yarn guiding member are introduced between the pressing roll disposed so as to oppose the peripheral face of the wheel and located in the downstream of the extrusion nozzle in the rotation direction of the die wheel and the elevated portions of the flat plate-like substrate circulating along with the peripheral face of the die wheel. At this time, the protruded rows of the pressing roll press locally the rows of the entangled yarns introduced to top faces of the elevated portions in molten state so that ¼ or more of the cross sectional areas are buried in the elevated portions. As a result, the respective entangled yarns are fused integrally with the elevated portions intermittently so as to produce the female engaging member having the structure as described above.

In a fourteenth aspect, the yarn guiding member is fixed at a position for introducing and guiding each row of the entangled yarns toward the peripheral face of the die wheel corresponding to the arcuated grooves. The respective rows of entangled yarns are fused integrally such that they are locally buried in the top faces of the elevated portions, whereby producing the female engaging member according to the second aspect. In the fifteenth aspect of the invention, the yarn guiding member reciprocates in parallel to an axis of the pressing roll synchronously with a rotation of the pressing roll. In this case, the respective rows of entangled yarns cross the elevated portions such that they meander and are fused integrally with the elevated portions at crossing portions thereof, whereby producing the female engaging member according to the third aspect.

According to the sixteenth aspect of the invention, the die wheel reciprocates in an axial direction of the die wheel synchronously with a rotation of the pressing roll. In this case, if the yarn guiding member is fixed, multiple rows of entangled yarns are introduced linearly and in parallel to the first surface of the substrate having the elevated portions molded on the peripheral face of the die wheel. At this time, the die wheel reciprocates in the axial direction and therefore, the elevated portions repeatedly meander. As a result, the respective rows of the entangled yarns are fed linearly in the rotation direction of the die wheel such that they cross the upper surfaces of the meandering elevated portions. At the same time, the rows of entangled yarns are pressed locally to the elevated portions at the crossing portions by means of the pressing roll. As a result, they are fused to the elevated portions in molten state at the crossing portions, whereby the female engaging member according to the fourth aspect is produced.

The yarn guiding member can be reciprocated in parallel to the die wheel like the die wheel. In this case, by deviating the reciprocating cycles of the die wheel and yarn guiding member by 180°, the meandering elevated portions cross the rows of entangled yarns, so that the entangled yarns are fused integrally with the top faces of the elevated portions at the crossing portions. Thus, the female engaging member according to the fourth aspect is produced.

According to a seventeenth aspect of the present invention, there is provided a production apparatus for producing the female engaging member of a surface fastener according to the first aspect, characterized by comprising: a die wheel rotating in one direction; an extrusion nozzle having an opposing face opposing a peripheral face of said die wheel with a predetermined gap and having an extruding port provided on part of said opposing face to extrude molten resin; and a yarn guiding member for supplying and guiding each row of the entangled yarns toward a gap between the peripheral face of the die wheel located in an upstream of said extruding nozzle in the rotation direction of said die wheel and said extruding nozzle with a predetermined interval, wherein an opposing face of said extrusion nozzle is a smooth face, and a multiplicity of continuous circular grooves are formed in parallel to each other in its peripheral face of said die wheel in the peripheral direction at an arbitrary interval.

The molten resin material is extruded from the substantially rectangular extruding port which is longer in the width direction of the extrusion nozzle to a smooth surface of the die wheel rotating in one direction and circulated between the die wheel and the opposing face of the extrusion nozzle in accordance with a rotation of the die wheel. At this time, the multiple rows of entangled yarns are circulated along bottom surfaces of the corresponding circular grooves, together with the die wheel. The molten resin material extruded from the extruding nozzle invades into the multiple rows of circular grooves formed in the peripheral face of the die wheel. Thus, the flat plate-like substrate is molded on the peripheral face of the die wheel, and at the same time, multiple rows of continuous elevated portions extending in the rotation direction of the die wheel are molded integrally on the first surface of the substrate.

In the eighteenth aspect of the invention, a multiplicity of protrusions having a lower height than a depth of the respective circular grooves are provided at a predetermined interval along inside of the circular grooves.

Because a multiplicity of the protrusions are protruded at a predetermined interval within the circular grooves, the rows of entangled yarns introduced to the top faces of the elevated portions in molten state are pressed locally such that ¼ then more of the cross sectional areas are buried therein. As a result, the respective entangled yarns are fused integrally with the rows of the elevated portions intermittently. Consequently, the female engaging member having a similar structure to the second aspect is produced, likewise the production apparatus according to the thirteenth aspect.

According to a nineteenth aspect of the present invention, there is provided a production apparatus for producing especially the female engaging member of a surface fastener according to the fifth aspect, comprising a die wheel rotating in one direction; an extrusion nozzle having an opposing face opposing a peripheral face of said die wheel with a predetermined gap and having an extruding port provided on part of said opposing face to extrude molten resin; and a yarn guiding member for supplying and guiding each row of the entangled yarns toward a gap between the peripheral face of the die wheel located in an upstream of said extruding nozzle in the rotation direction of said die wheel and said extruding nozzle with a predetermined interval, wherein an opposing face of said extrusion nozzle is a smooth face, and a multiplicity of continuous circular grooves are formed in parallel to each other in the peripheral face of said die wheel in its peripheral direction at an arbitrary interval, and a multiplicity of groove portions crossing the respective circular grooves are formed with a predetermined phase difference in said peripheral direction, and a depth of said circular grooves is set to be substantially 4 to 1 times larger than the depth of said groove portions crossing said circular grooves.

A multiplicity of rows of the entangled yarns are guided by the yarn guiding member and introduced to the multiple circular grooves formed in parallel in the peripheral face of the die wheel in the peripheral direction. After that, molten resin material is extruded from the extruding nozzle to the peripheral face of the die wheel. The extruded resin material fills a gap of the same thickness as a substrate thickness formed between the extrusion nozzle and the peripheral face of the die wheel, thereby molding the substrate. At the same time, the groove portions in parallel in the axial direction formed in the peripheral face of the die wheel are filled with resin material, thereby molding the elevated portions. The entangled yarns introduced to the circular grooves of the die wheel are fused integrally when the elevated portions are molded, such that ¼ or more of the cross sectional areas are buried in the elevated portions at the crossing portions between the circular grooves and the aforementioned groove portions parallel in the axial direction. In the female engaging member of this aspect, the rows of entangled yarns disposed in the length direction of the first surface of the flat plate-like substrate are fused integrally with the elevated portions such that they cross the elevated portions disposed in the width direction of the substrate and ¼ or more of cross sectional areas of the entangled yarns are buried.

According to a twentieth aspect of the present invention, there is provided a production apparatus according to the thirteenth, seventeenth or nineteenth wherein a multiplicity of male-engaging-element-molding cavities are formed in the peripheral face of said die wheel.

The female engaging member of the surface fastener having a structure according to the fifth aspect can be produced by a production apparatus of the female engaging member having a structure according to a twenty first aspect of the invention.

According to the twenty first aspect of the present invention, the apparatus is characterized by a pressing roll a molding roll provided so as to oppose said pressing roll with a gap corresponding to a thickness of said flat plate-like substrate; and an extruding nozzle for extruding molten resin to a gap between said pressing roll and molding roll, a multiplicity of ring-shaped grooves extending parallel and continuous and formed in a peripheral direction of the molding roll for introducing said entangled yarns along a peripheral face of said molding roll to a gap between said pressing roll and said molding roll and a multiplicity of groove portions extending in an axial direction of the molding roll and disposed with a predetermined phase difference formed in the peripheral face of said molding roll.

Multiple rows of the entangled yarns are introduced to the ring-shaped grooves formed in the peripheral face of the molding roll. At this time, molten resin material is extruded from the extruding nozzle to a gap between the pressing roll and molding roll. The extruded molten resin material forms the flat plate-like substrate at the gap between the pressing roll and the molding roll and fills the groove portions formed parallel to the axis of the molding roll while being fused with the surface portions of the entangled yarns circulated on the molding roll in the peripheral direction, thereby molding the elevated portions. Upon molding of this elevated portions, the molten resin material is fused integrally such that ¼ or more of cross sectional areas of the entangled yarns are covered with the elevated portions at the crossing portions with the ring-shaped grooves for guiding the rows of the entangled yarns, thus the female engaging member according to the fifth aspect is produced.

According to a twenty second aspect of the present invention, there is provided a production apparatus for producing the male engaging member of a surface fastener according to the sixth aspect, characterized by comprising: a pressing roll; a molding roll provided so as to oppose said pressing roll with, a gap corresponding to a thickness of said flat plate-like substrate; and an extruding nozzle for extruding molten resin to a gap between said pressing roll and molding roll, a multiplicity of ring-shaped grooves extending parallel and continuous in a peripheral direction of the molding roll for introducing and guiding said entangled yarns along a peripheral face of said molding roll to a gap between said pressing roll and said molding roll and a multiplicity of recesses having the same width dimension as or larger dimension than that of said ring-like grooves formed in the peripheral face of said molding roll, the recesses having a depth substantially ¼–1 of the groove depth of the ring-shaped grooves.

Like the aforementioned twenty first aspect, multiple rows of entangled yarns are introduced to the ring-shaped grooves formed in the peripheral face of the molding roll and circulated therewith. The molten resin extruded from the extruding nozzle forms the flat plate-like substrate between the pressing roll and the molding roll and is fused to the surface portions of the rows of the entangled yarns circulated in the peripheral direction of the molding roll. Then, the molten resin is charged into the multiple concave portions formed along the circumferential direction in the ring-shaped grooves, so that protrusions each covering substantially ¼ or more of cross sectional areas of each row of the entangled yarns are formed intermittently in the length direction of the entangled yarns. Thus, the female engaging member according to the sixth aspect is produced.

According to a twenty third aspect of the invention, there is provided a production apparatus according to the twenty first or twenty second aspect, wherein a multiplicity of the male-engaging-element-molding cavities are formed in the peripheral face of the pressing roll. Consequently, the aforementioned male engaging elements are molded on the second surface of the flat plate-like substrate simultaneously with the female engaging elements on the first surface. The molded product is available as an engaging device for a band or paper diaper.

According to a twenty fourth aspect of the invention, there is provided a production apparatus according to any of the twenty first to twenty third aspects, wherein a multiplicity of the male-engaging-element-molding cavities are formed in the peripheral face of the molding roll. In this production apparatus ,for the female engaging member, multiple male-engaging-element-molding cavities are formed in the peripheral face of the molding roll so that hook-shaped or palm tree shaped male engaging elements can be molded on the first surface of the flat plate-like substrate simultaneously with the female engaging elements to secure the self-engaging performance.

DESCRIPTION OF EMBODIMENTS

Figure 1:
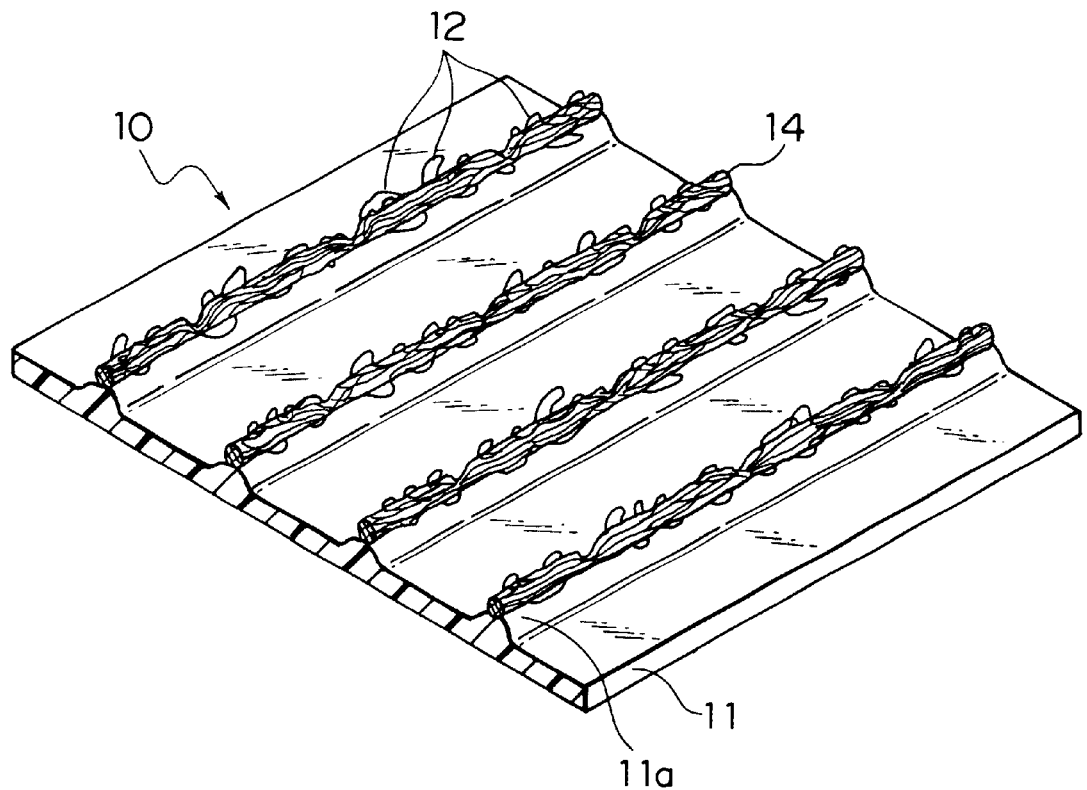
FIG. 1 is a schematic perspective view showing a first embodiment of a female engaging member of a surface fastener according to the present invention.
Figure 2:
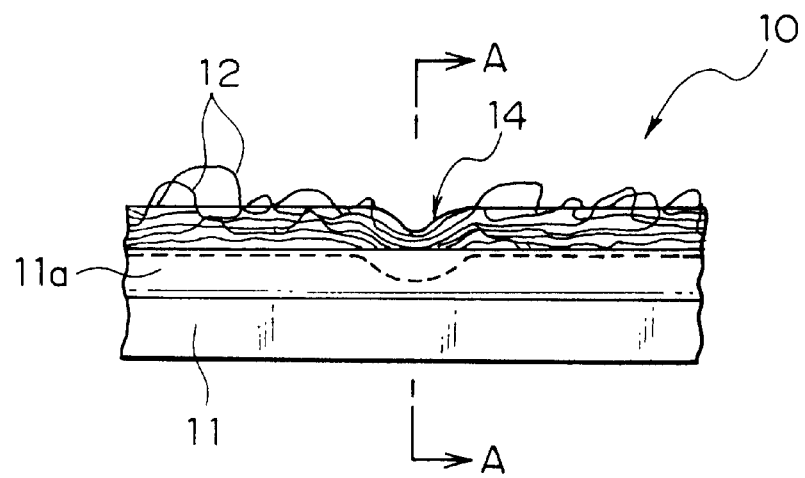
FIG. 2 is a partial side view of the same female engaging member.
Figure 3:
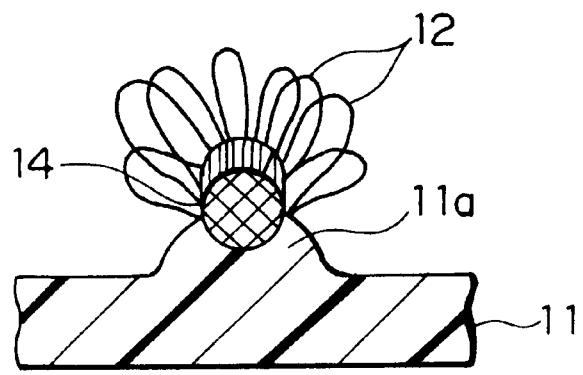
FIG. 3 is a sectional view taken along the line A—A of FIG. 2.

Hereinafter preferred embodiments of the present invention will be described in detail with reference to the accompanying drawings. FIGS. 1 to 3 are partial perspective views schematically showing a first embodiment of the female engaging member of the surface fastener including an engaging element of a typical configuration of the present invention.

First, a basic structure of the female engaging member of the present invention will be described below. A female engaging member 10 of the surface fastener is composed of a flat plate-like substrate 11 having a first surface and a second surface, the first surface having a plurality of pile-like engaging elements 12. The female engaging member 10 comes into a plane contact with a mating male engaging member of the surface fastener. The aforementioned pile-like engaging elements 12 are composed of rows of multifilament entangled yarns 14 each having a plurality of piles on the surface thereof. The entangled yarns 14 composed of these pile-like engaging elements may be composite finished yarns which are produced by air jet processing in which two or more multifilaments supplied at different feeding speeds are passed through each cylinder into which a high pressure air flows and component filaments of respective multifilaments are entangled with each other so as to be fixed by heat. Alternatively, the entangled yarns 14 may be bulky crimped finished yarns which are produced by air jet processing in which highly crimped multifilaments are passed through cylinders and entangled with each other. Further alternatively, the entangled yarns 14 may be bulky thermal shrinkage yarns which are produced by air-jet processing two or more multifilaments having different thermal shrinkage rates and entangling their component filaments with each other. These yarns have a multiplicity of piles on the surface thereof and the piles act as loops which serve as female engaging elements of the surface fastener.

According to the embodiment shown in FIGS. 1 to 3, multiple rows of elevated portions 11a are provided integrally on the first surface of the aforementioned flat plate-like substrate 11. The entangled yarns 14 are fused integrally with a top face portion of the elevated portions 11a such that ¼ or more of the cross sectional areas of the entangled yarns 14 are intermittently buried therein. Generally, in case where for example, yarns having the aforementioned structure are brought into contact with the surface of synthetic resin material in molten state or semi-molten state and fused therewith integrally, the yarns are likely to be separated from the surface of the synthetic resin material. Therefore, if an external force which is not so large is applied, the yarn is separated easily. However, if ¼ or more of the cross sectional areas of the entangled yarns are buried in the synthetic resin material in molten state or semi-molten state by pressing with pressure as in the present invention, its fixing strength increases largely so that peeling strength necessary for ordinary surface fastener is secured. The peeling strength at this time differs depending on a shape or size of the male engaging element or a purpose of use. If the aforementioned fused portions buried in the surface of the flat plate-like substrate is smaller than ¼ of a total sectional areas of the entangled yarns, sufficient fixing strength can not be obtained.

The female engaging member of the surface fastener 10 according to the first embodiment of the present invention shown in FIGS. 1 to 3 will be described in detail. The female engaging member 10 is comprised of the flat plate-like substrate 11 molded of thermoplastic synthetic resin and the female engaging elements 12 of loops arranged in multiple lines on the surface of the flat plate-like substrate 11. A prominent feature of the present invention is in the shape of the engaging element 12 and a manner of fixing of the pile-like engaging elements 12 to the flat plate-like substrate 11.

That is, a multiple rows of the elevated portions 11a are provided integrally with the surface of the flat plate-like substrate 11 such that they extend parallel to each other. On the other hand, the aforementioned engaging elements 12 are composed of bulky yarns in which a multiplicity of piles are produced by entangling a plurality of fibers (filaments) with each other. According to this embodiment, the entangled yarns 14 composing the aforementioned engaging elements extend along top faces of the elevated portions 11a such that they are attached to the faces. As shown in FIGS. 2 and 3, part of the aforementioned pile-like engaging elements 12 are concaved at a predetermined interval in a length direction of the yarns into concave top faces of the elevated portions 11a such that ¼ of the cross sectional areas of the yarns 14 are buried therein to be fused integrally.

Figure 7:
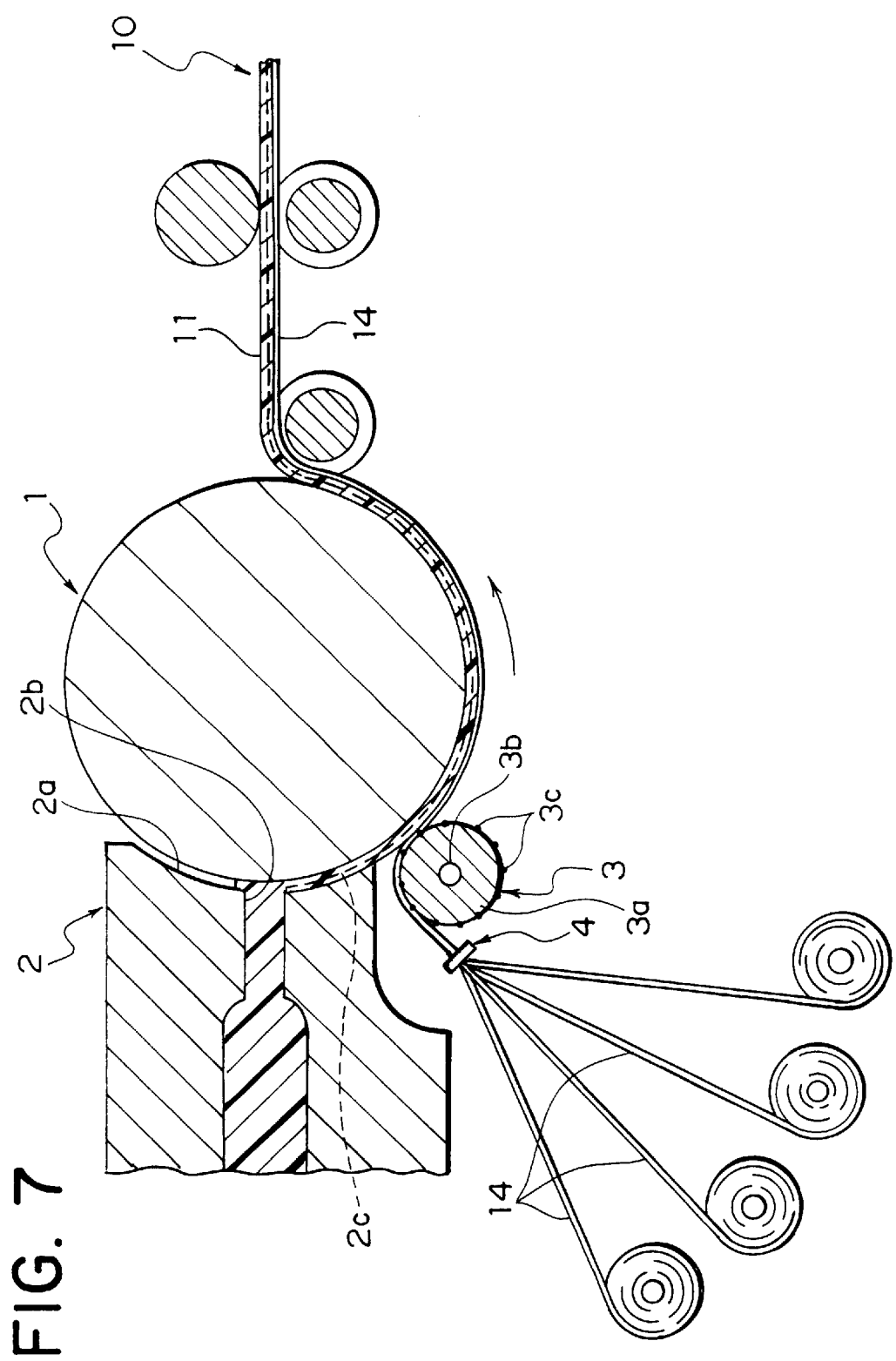
FIG. 7 is an explanatory view schematically showing an example of production apparatus for the female engaging member and its production process.
Figure 8:
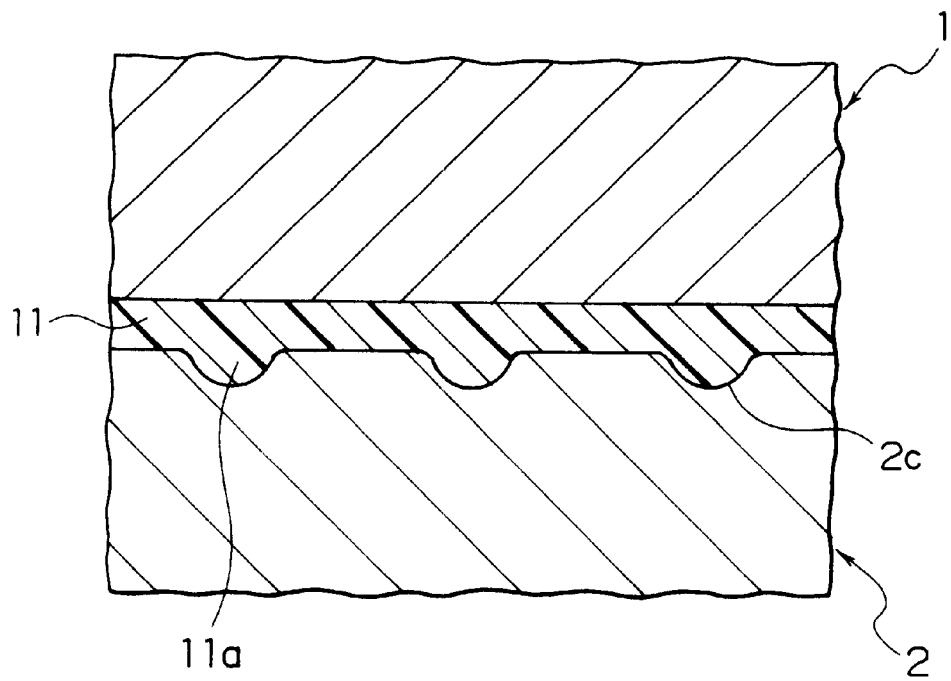
FIG. 8 is a partial sectional view showing a shape of a gap portion between an extrusion nozzle and a die wheel of the production apparatus opposing each other and an example of a molding shape of molten resin material to be filled in the gap portion.

The female engaging member 10 having such a structure can be produced effectively by means of the production apparatus of the present invention shown in FIG. 7. As shown in FIG. 7, an extrusion nozzle 2 is disposed so as to oppose part of a peripheral face of a die wheel 1 rotating in the direction of an arrow as shown in FIG. 7. The peripheral face of the die wheel 1 is composed of a smooth face and the extrusion nozzle 2 has an extruding port 2b which extends in parallel to an axis of the die wheel 1 substantially in a center of its circular opposing face 2a opposing the peripheral face of the die wheel 1. As shown in FIGS. 7 and 8, a multiplicity of arcuated-elevated-portion-molding grooves 2c communicating with the aforementioned extruding port 2b are formed on the opposing face 2a in parallel and along the peripheral direction in the downstream of the extruding port 2b in the rotation direction of the die wheel 1.

Figure 9:
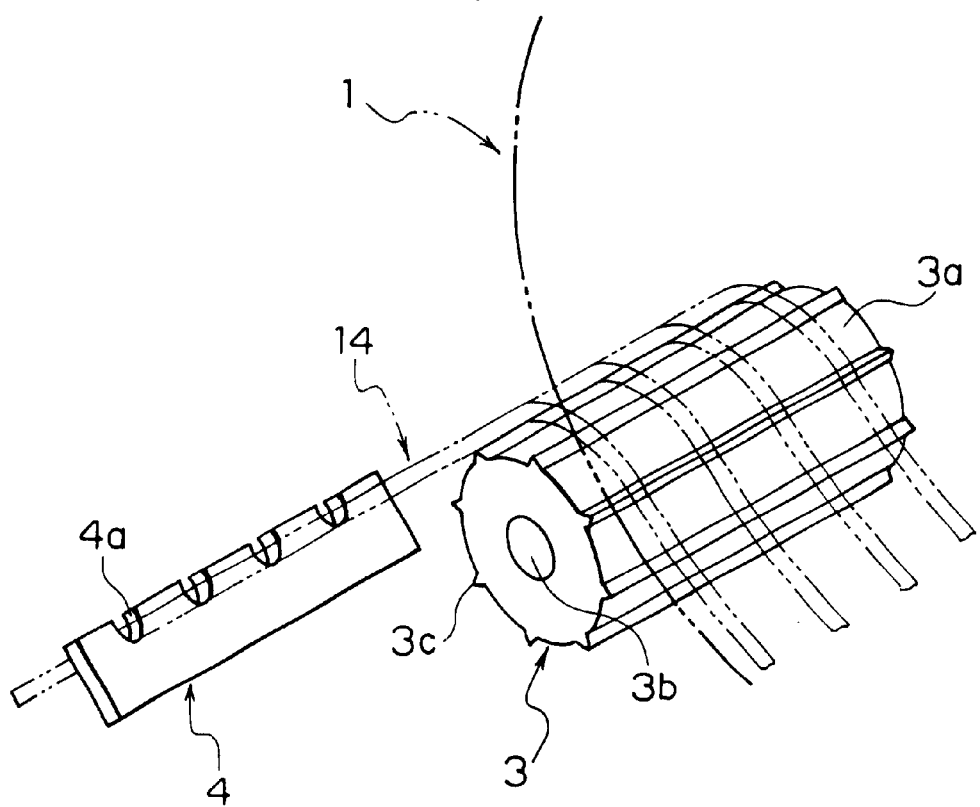
FIG. 9 is a schematic perspective view showing a relation in disposition between a pressing roll disposed to be opposed to the die wheel and a yarn guide member.

On the other hand, a pressing roll 3 is disposed rotatably so as to oppose the peripheral face of the die wheel 1 in a downstream of the extrusion nozzle 2 in the rotation direction. As shown; in FIG. 9, the pressing roll 3 is formed with a multiplicity protruded rows 3c on the peripheral face of a roll main body 3a, extending parallel to a rotating axis with a predetermined phase difference in a circumferential direction thereof. Then, a yarn guiding member 4 is disposed in the vicinity of the aforementioned pressing roll 3. This yarn guiding member 4 is formed in a comb-like shape in which a plurality of yarn guiding grooves 4a are formed by cutting out at a predetermined interval along a long side of a single rectangular plate as shown in FIG. 9. According to this embodiment, the number of the yarn guiding grooves 4a is the same as that of the arcuated-elevated-portion-molding grooves 2c formed in the extrusion nozzle 2.

When molten resin material is extruded toward the smooth peripheral face of the die wheel 1 rotating in one direction from the extruding port 2b of the extrusion nozzle 2, the molten resin material is charged between the peripheral face of the die wheel 1 and the opposing face 2a of the extrusion nozzle 2, so that the charged molten resin is circulated with a predetermined thickness in the rotation direction of the die wheel 1 in accordance with a rotation of the die wheel 1. The molten resin material extruded from the extrusion nozzle 2 at this time is charged also in the multiple arcuated-elevated-portion-molding grooves 2c formed in the opposing face 2a of the extrusion nozzle 2. Thus, the flat plate-like substrate 11 is molded along the peripheral face of the die wheel 1. At the same time, a plurality of rows of the elevated portions 11a are molded integrally on the first surface of the flat plate-like substrate 11 such that they extend continuously along the rotation direction of the die wheel 1.

On the other hand, a multiplicity of the entangled yarns 14 are guided by the yarn guiding member 4 and introduced in parallel between the pressing roll 3 disposed so as to oppose the wheel peripheral face located in the downstream of the extrusion nozzle 2 in the rotation direction of the die wheel 1 and the elevated portions 11a of the flat plate-like substrate 11 rotating as being adhered to the peripheral face of the die wheel 1. At this time, the protruded rows 3c of the pressing roll 3 press locally the rows of the entangled yarns 14 introduced to top faces of the elevated portions 11a in molten state to such an extent that ¼ or more of the cross sectional areas are buried into the elevated portions 11a. By this pressing, the elevated portions 11a that are in molten state or semi-molten state are expanded horizontally and concaved intermittently. Then, the entangled yarns 14 are intermittently fused integrally in the elevated portions 11a such that ¼ or more of the cross sectional areas are buried therein. As a result, the female engaging member having the above described structure as shown in FIGS. 1 to 3 is produced.

Figure 4:
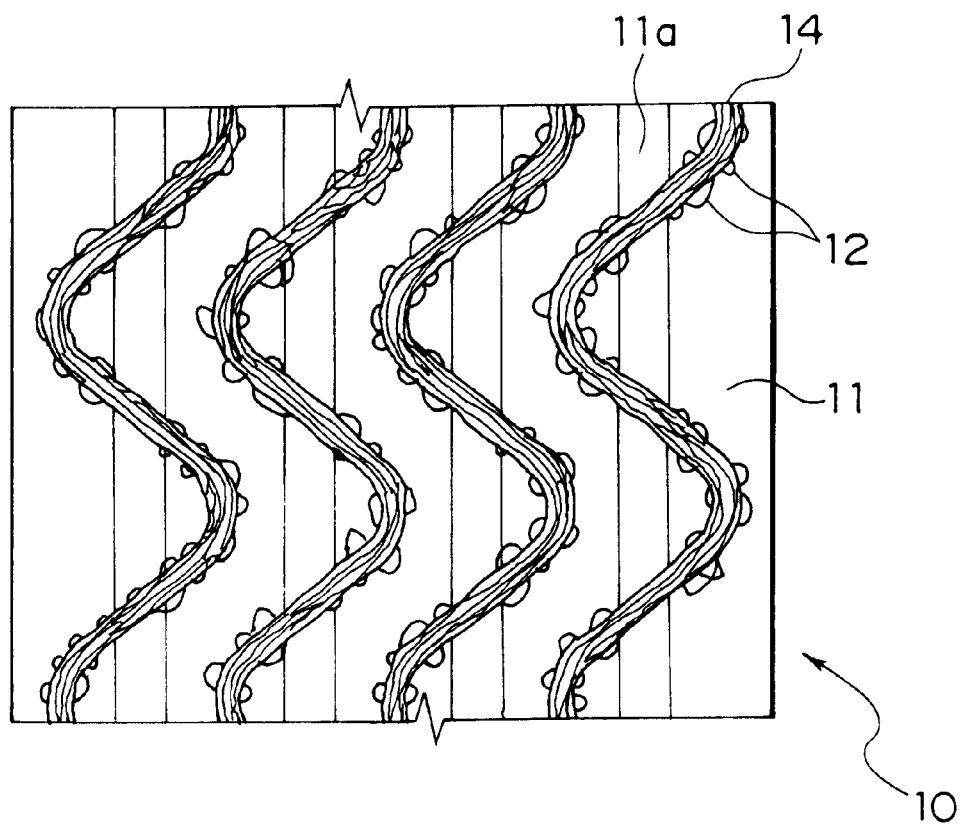
FIG. 4 is a schematic plan view showing a second embodiment of the female engaging member of the surface fastener according to the present invention.

FIG. 4 shows a second embodiment of the female engaging member 10 of the present invention. As understood from the Figure, the entangled yarns 14 meander so as to cross respective multiple rows of elevated portions 11a disposed in parallel on the first surface of the flat plate-like substrate 11, with a predetermined interval. Then, the entangled yarns 14 are pressed locally by the protruded rows 3c of the pressing roll 3 at these crossing portions so that part of the entangled yarns 14 is pushed into the top faces of the elevated portions 11a and fused integrally therewith as in the previously described embodiment. Therefore, because according to this embodiment, the entangled yarns 14 do not extend linearly along the elevated portions 11a but are disposed such that they meander, engaging areas with hooks or mushroom engaging elements which are mating engaging elements increase without having a certain engaging orientation. As a result, the engaging rate increases, so that the engaging strength and peeling strength can be improved.

Figure 5:
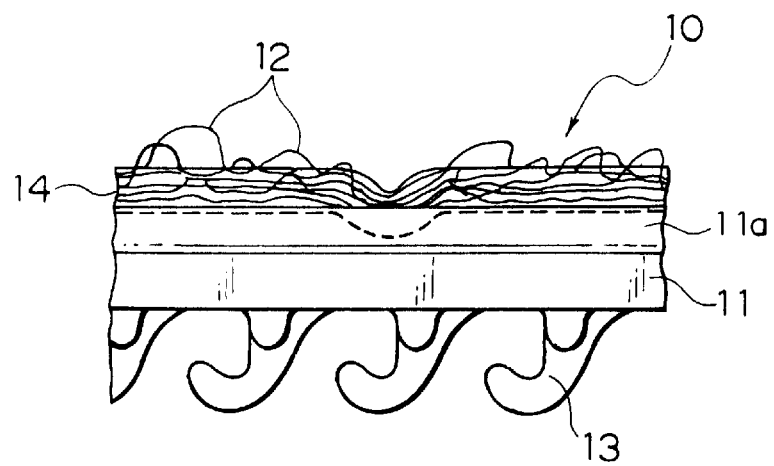
FIG. 5 is a partial side view showing a third embodiment of the female engaging member of the surface fastener according to the present invention.
Figure 10:
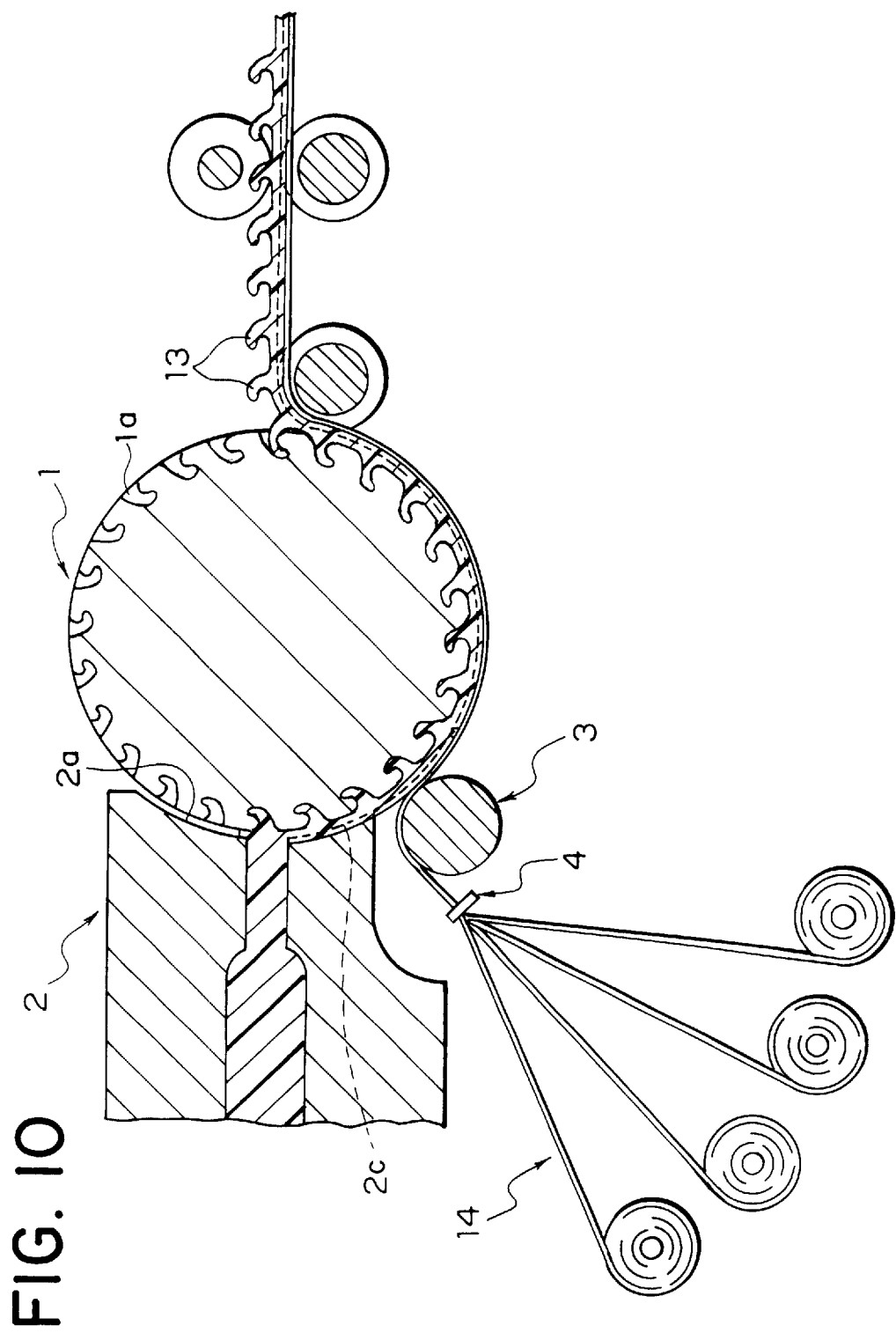
FIG. 10 is an explanatory view schematically showing an example of production process of the female engaging member shown in FIGS. 5 and 6.

FIG. 5 shows a third embodiment of the female engaging member 10 of the present invention. As evident from the Figure, a multiplicity of hook-shaped male engaging elements 13 are disposed on the second surface on an opposite side to the first surface of the flat plate-like substrate 11 of the female engaging member 10 of the first embodiment as shown in FIGS. 1 to 3. Namely, this surface fastener has a self-engaging performance. The female engaging member 10 of this embodiment is produced effectively by means of a production apparatus of the present invention as shown in FIG. 10. The production apparatus shown in FIG. 10 is different from the previously described production apparatus as shown in FIG. 7 in that the peripheral face of the die wheel 1 is not a smooth surface but a multiplicity of hook-shaped male-engaging-element-molding cavities 1a are molded in the peripheral face of the die wheel 1 corresponding to portions between the respective elevated portions 11a. The structure of the die wheel 1 and the technology of molding the hook-shaped male engaging elements 13 integrally in the flat plate-like substrate using the die wheel 1 have been widely known through for example, U.S. Pat. No. 5,690,875. Therefore, a description thereof is omitted and the molding principle should be understood easily from FIG. 10.

Figure 11:
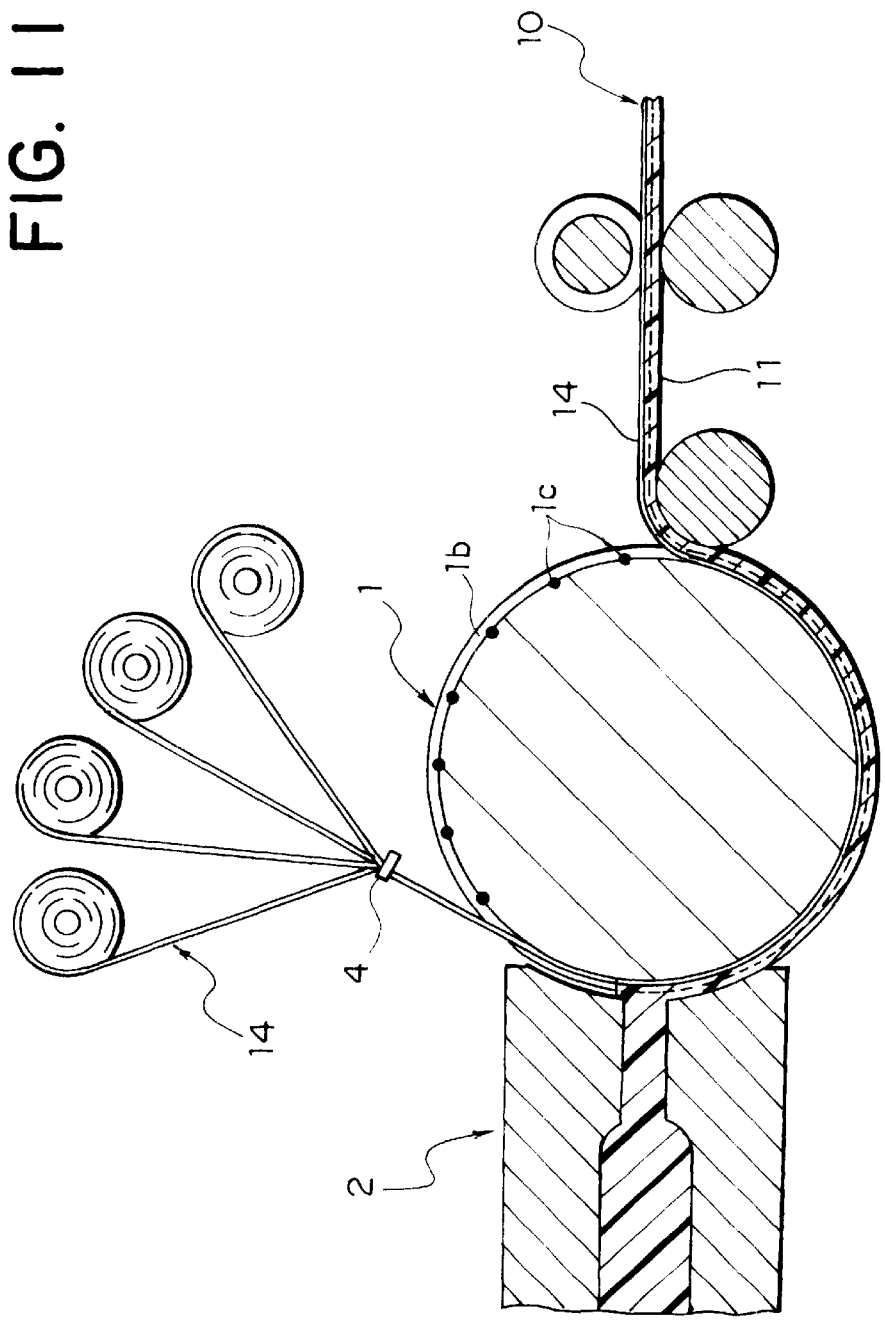
FIG. 11 is a explanatory view schematically showing another production apparatus for the female engaging member shown in FIGS. 1 to 3 and its production process.

FIG. 11 shows an example of the production apparatus for the female engaging member 10 according to the first embodiment of the present invention shown in FIGS. 1 to 3. As understood from the Figure, according to this production apparatus, a plurality of rows of the entangled yarns 14 are circulated along the peripheral face of the die wheel 1 via the yarn guiding member 4. Then, they are introduced into the extruding gaps between the peripheral face of the die wheel 1 and the extrusion nozzle 2 disposed in a downstream of the rotation direction. Thus, according to this production apparatus, a plurality of continuous circular grooves are formed in parallel to each other, with an arbitrary interval peripherally, in the peripheral face of the die wheel 1 and a plurality of protrusion rows are provided inside of the circular groove with a predetermined interval. On the other hand, the aforementioned arcuated-elevated-portion-molding grooves 2c are not formed in the face of the extrusion nozzle 2 opposing the die wheel 1 and instead, that face is smooth.

Now, molten resin material is extruded from the extruding port 2b of the extrusion nozzle 2 of a substantially rectangular shape, which is longer in a width direction toward the peripheral face of the die wheel 1 rotating in a single direction. Then, the molten resin is circulated in the rotation direction between the die wheel 1 and an opposing face of the extrusion nozzle 2 together with the die wheel 1. At this time, the plurality of the entangled yarns 14 are introduced along a bottom face of each circular groove 1b formed in the peripheral face of the corresponding die wheel 1 through the yarn guiding member 4 and circulated together with the die wheel 1. The molten resin material extruded from the extrusion nozzle 2 at this time forms the flat plate-like substrate 11 on the peripheral face of the die wheel 1 and at the same time, invades into the plurality of the circular groove 1b formed in the peripheral face of the die wheel 1. Consequently, a multiplicity of the continuous elevated portions 11a extending in the rotation direction of the die wheel are molded on the first surface of the same substrate 11.

On the other hand, the protrusions 1c lower than the depth of the circular groove 1b are protruded inside the aforementioned circular groove 1b at a predetermined interval. Therefore, the protrusion rows 1c locally press the rows of the entangled yarns 14 introduced to the top faces of the elevated portions 11a in molten state such that ¼ or more of their cross sectional areas are buried into the elevated portions 11a. Consequently, the entangled yarns 14 are fused integrally with the elevated portions 11a intermittently, so that the female engaging member 10 having a structure shown in FIGS. 1 to 3 is produced.

Figure 6:
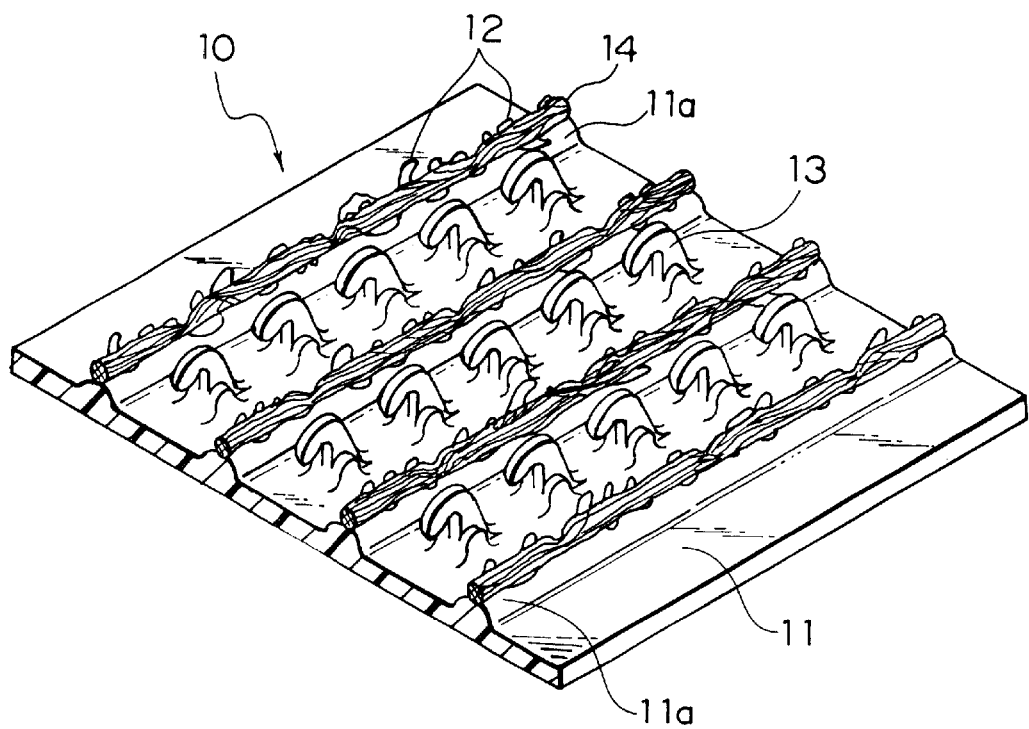
FIG. 6 is a schematic perspective view showing a fourth embodiment of the female engaging member of the surface fastener according to the present invention.

By forming a multiplicity of the hook-shaped male-engaging-element-molding cavities on the circumference at portions between the respective circular grooves 1b formed in the aforementioned die wheel 1, a female engaging member 10 according to the fourth embodiment of the present invention shown in FIG. 6 can be produced effectively. As evident from the Figure, this female engaging member 10 is a surface fastener having self-engaging performance in which a multiplicity of the hook-shaped male engaging elements 13 are molded on the first surface of the flat plate-like substrate 11 enclosed between the respective elevated portions 11a, in addition to the female engaging member according to the first embodiment shown in FIGS. 1 to 3.

Figure 12:
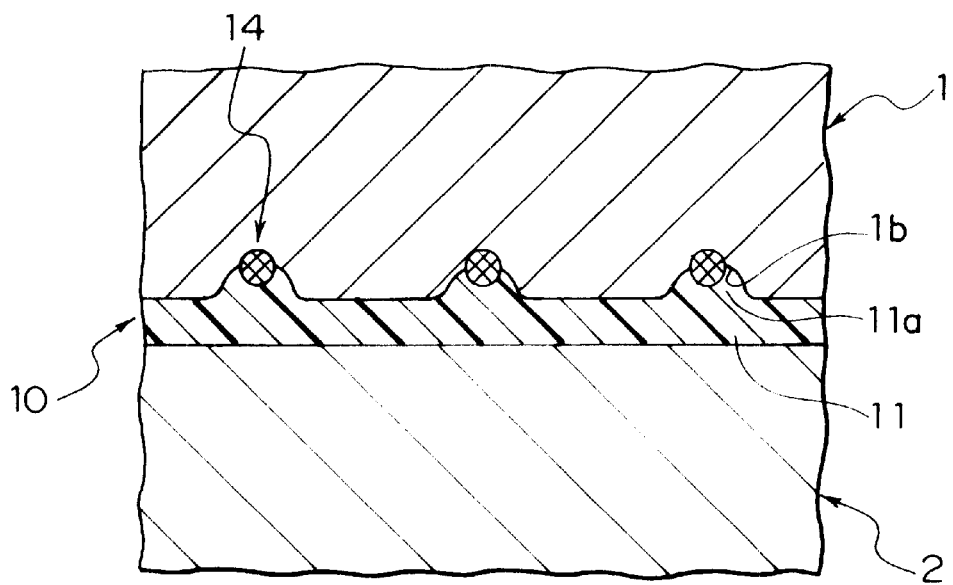
FIG. 12 is a partial sectional view showing an other embodiment of the female engaging member to be produced by the apparatus as the aforementioned production apparatus.
Figure 13:
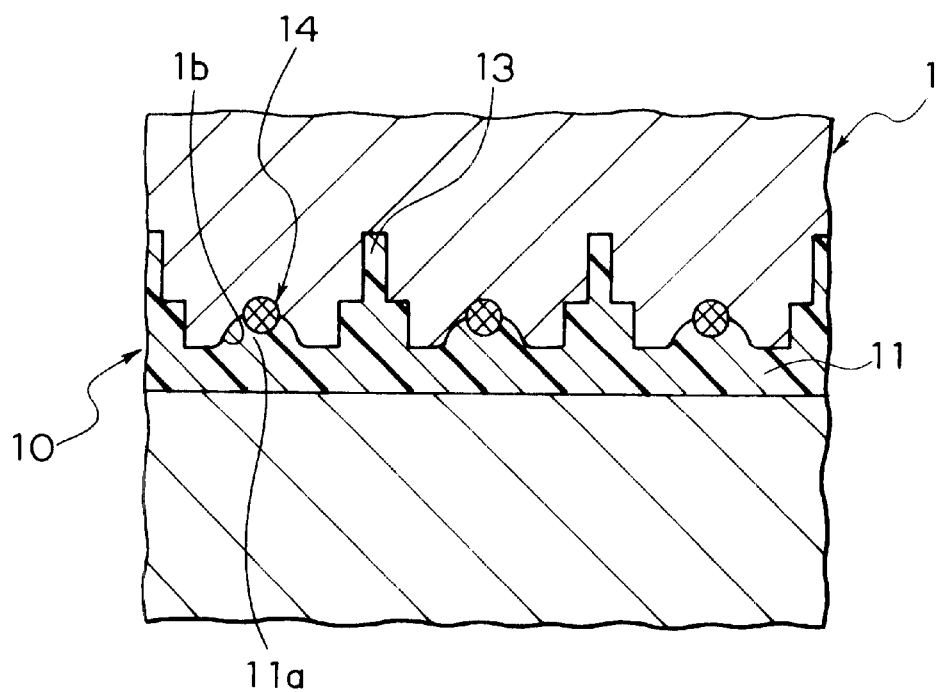
FIG. 13 is a partial sectional view showing another embodiment of the female engaging member to be produced by the apparatus as the production apparatus shown in FIG. 10.

According to this embodiment, as shown in FIGS. 12 and 13, the aforementioned protrusion rows 1c are eliminated and the elevated portions 11a are molded. At the same time, the entangled yarns 14 are fused integrally in the elevated portions 11a such that ¼ or more of the cross sectional areas thereof are buried through entire lengths of the entangled yarns along the top faces of the elevated portions 11a. As a result, the bonding strength of the entangled yarns 14 is increased extremely as compared to the production time by the production apparatus shown in FIG. 7. Therefore, the necessity of the aforementioned protrusion rows 1c is eliminated.

Figure 14:
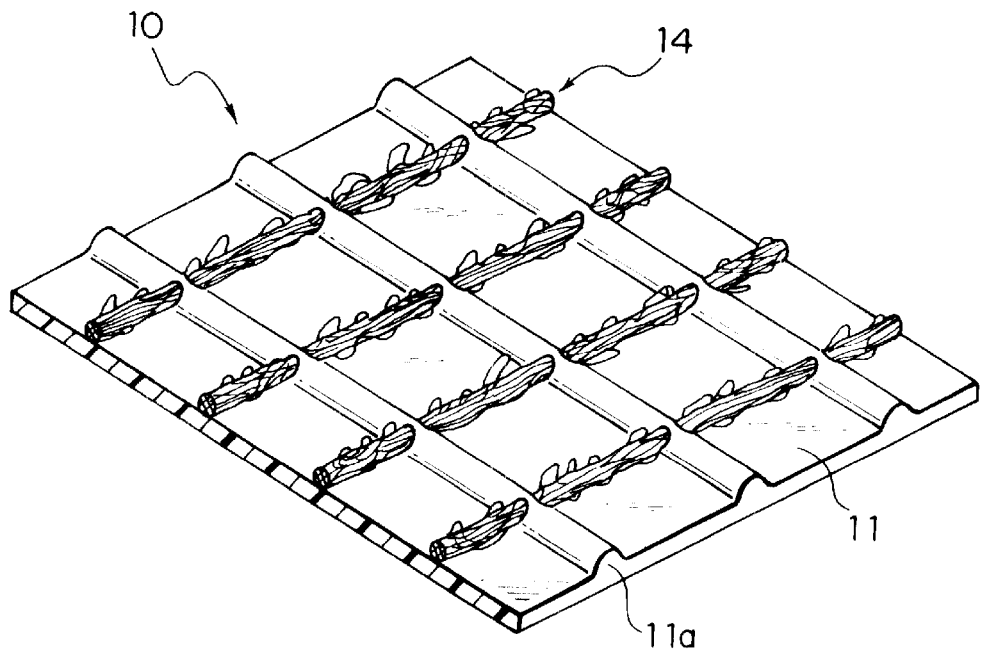
FIG. 14 is a schematic perspective showing a fifth embodiment of the female engaging member of the surface fastener according to the present invention.

FIG. 14 shows a fifth embodiment of the female engaging member 10 of the present invention, in which a plurality of rows of the elevated portions 11a are molded integrally with the surface of the flat plate-like substrate 11 such that they cross a plurality of the entangled yarns 14 disposed linearly on the first surface of the flat plate-like substrate 11 substantially at the right angle. The aforementioned entangled yarns 14 cross the aforementioned elevated portions 11a substantially at the same height so that it looks that the elevated portions 11a are pierced laterally by the entangled yarns 14. With such a structure, the adhesion strength of the entangled yarns 14 is further improved as compared to the first to third embodiments.

Figure 16:
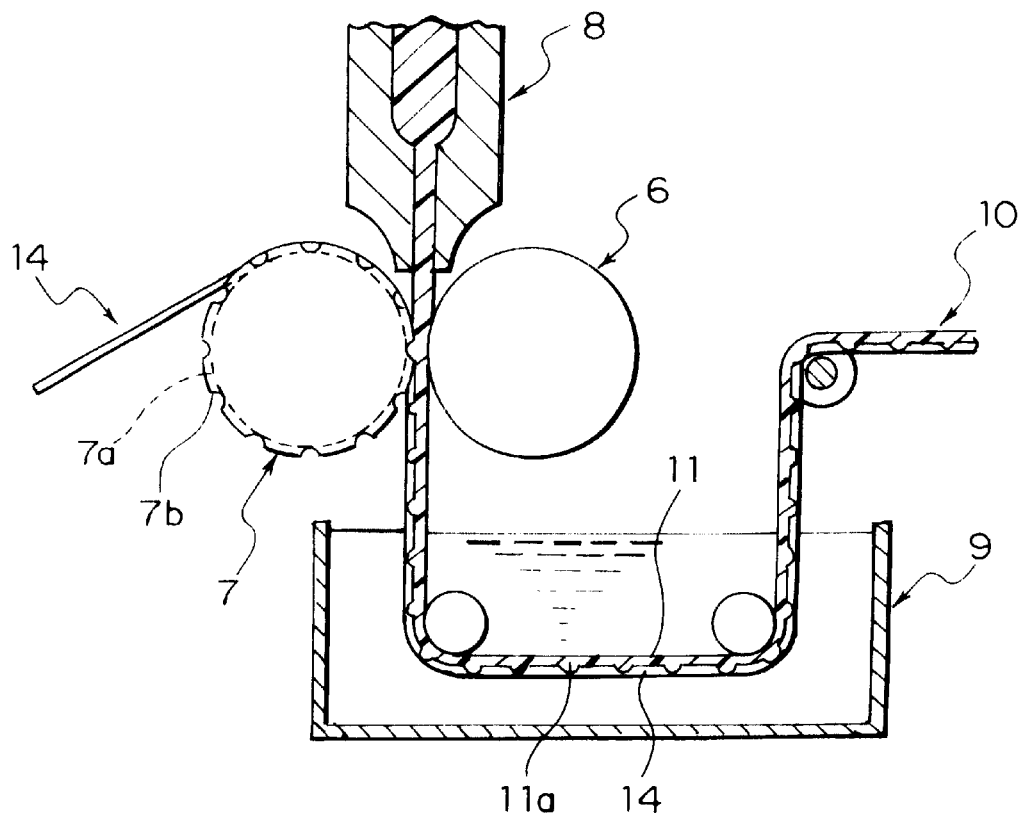
FIG. 16 is an explanatory view schematically showing a production apparatus for the female engaging member shown in FIGS. 14 and 15 and an example of its production process.

The female engaging member 10 of the fifth embodiment is produced effectively by the production apparatus as shown in FIG. 16.

Figure 17:
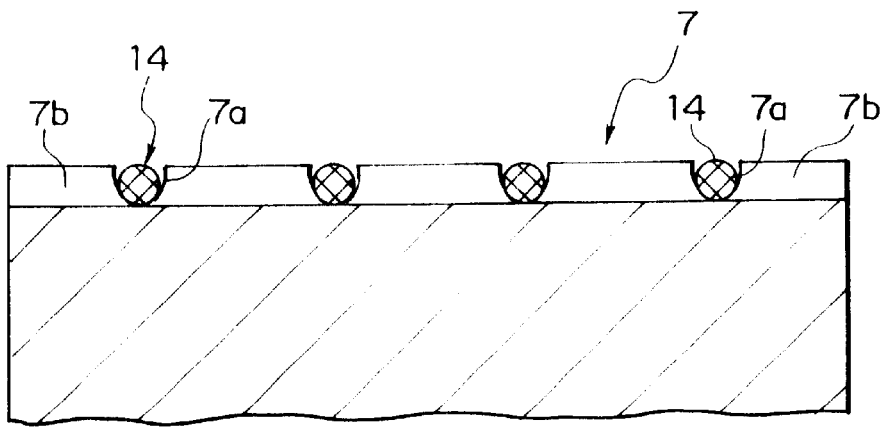
FIG. 17 is a partial sectional view showing a disposition of entangled yarns by a molding roll of the production apparatus when the female engaging member is being produced according to the fifth embodiment.

In the production apparatus for the female engaging member as shown in FIG. 16, a pair of rolls comprised of a pressing roll 6 and a molding roll 7 are disposed with a gap corresponding to a thickness of the flat plate-like substrate 11 such that a plane connecting their axis lines becomes a horizontal plane. An extruding nozzle 8 is provided to direct to the gap between the pressing roll 6 and molding roll 7 and then, flat-plate like molten resin material is extruded from the extruding nozzle 8 toward the gap. The peripheral face of the pressing roll 6 is smooth and the peripheral face of the molding roll 7 is formed with a plurality of ring-shaped grooves 7a continuous in the peripheral direction in parallel to each other to guide the entangled yarns 14 as shown in FIG. 17. Further, a plurality of linear elevated-portion-molding grooves 7b perpendicular to the ring-shaped grooves 7a for guiding the entangled yarns 14 are formed in the peripheral face of the molding roll 7 at a predetermined phase difference. Although the depths of the ring-shaped groove 7a and elevated-portion-molding grooves 7b are set to be substantially the same, the depths thereof may be changed appropriately depending on the adhesion strength of the entangled yarns 14 to the elevated portions 11a.

A plurality of the entangled yarns 14 to be guided in arranged rows by a yarn guiding member (not shown) are supplied from sideways of the molding roll 7 into the corresponding ring-shaped grooves 7a continuously. At this time, flat-plate like molten resin material is extruded from the extruding nozzle 8 toward the gap between the pressing roll 6 and the molding roll 7. Then, the flat plate-like substrate 11 is molded between the pressing roll 6 and the molding roll 7 which rotate in opposite directions and the respective entangled yarns 14 are fused to the first surface of the flat plate-like substrate 11 continuously in the molding direction. At this time, the elevated-portion-molding grooves 7b are filled with the molten resin material so as to mold the elevated portions 11a. Consequently, the female engaging member 10 having such a structure is produced.

In the production apparatus shown in FIG. 16, the female engaging member 10 passing between the pressing roll 6 and the molding roll 7 is passed through water within a water bath 9 provided below the rollers 6, 7 so as to be cooled and hardened and then transferred to a next process.

Figure 15:
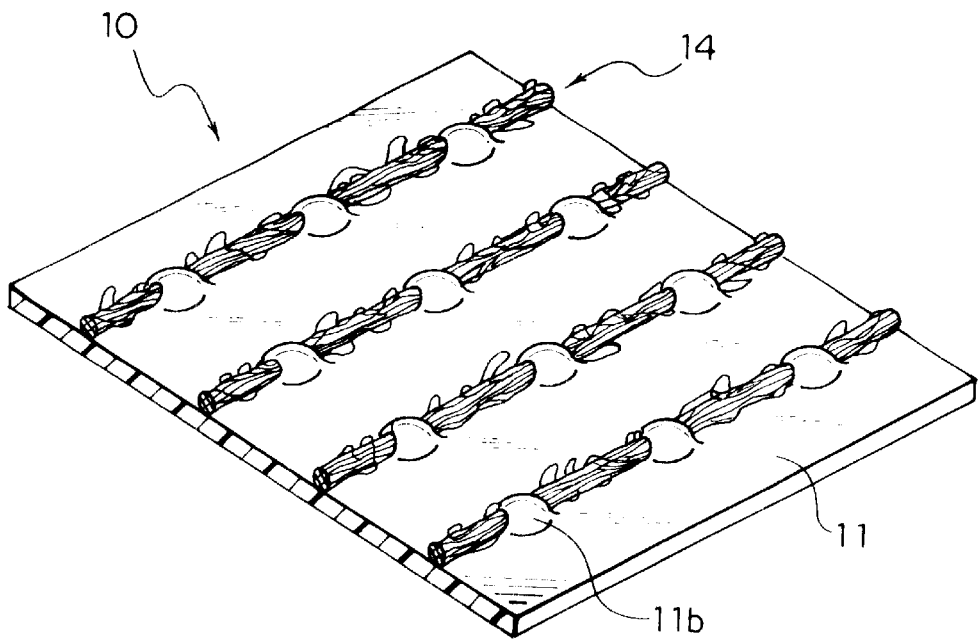
FIG. 15 is a schematic perspective view showing a sixth embodiment of the female engaging member of the surface fastener according to the present invention.

FIG. 15 shows a sixth embodiment of the female engaging member 10 of the present invention. The multiple entangled yarns 14 fused in parallel to the first surface of the flat plate-like substrate 11 are covered locally with resin material of the same quality as the flat plate-like substrate 11 at a predetermined interval in the length direction. With such a structure, a strong fixing strength of the entangled yarn 14 with respect to the flat plate-like substrate 11 can be secured. Further, because the portions where the entangled yarns 14 are positively fixed are points, even if the flat plate-like substrate 11 is very thin and flexible, its characteristic performance is not lost. The female engaging member 10 of this embodiment can be produced by means of a production apparatus similar to the one shown in FIG. 16.

Figure 18:
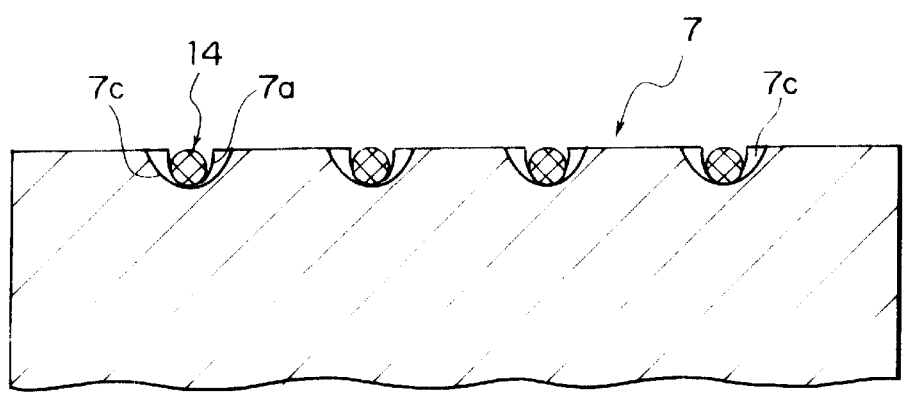
FIG. 18 is a partial sectional view showing a disposition of entangled yarns by a molding roll of the production apparatus when the female engaging member is being produced according to the sixth embodiment.

Specifically, according to the production apparatus of the female engaging member 10 according to this embodiment, the elevated-portion-molding grooves 7b of the molding roll 7 is eliminated in the production apparatus shown in FIG. 16. Instead, semi-circular concave portions 7c shown in FIG. 18 are formed at a predetermined interval along the ring-shaped grooves 7a formed in the peripheral face of the molding roll 7. These concave portions 7c are set slightly deeper than a groove depth of the ring-shaped grooves 7a and an opening diameter thereof is set slightly larger than the groove width of the ring-shaped grooves 7a. In the meantime, the groove depth may be changed appropriately depending on the joining strength between the elevated portions 11a and entangled yarns 14.

In production of the female engaging member 10 shown in FIG. 15, like the production of the female engaging member 10 shown in FIG. 14, multiple pieces of the entangled yarns 14 guided in neat rows by the yarn guiding member (not shown) from sideways of the molding roll 7 are supplied continuously into the corresponding ring-shaped grooves 7a and at the same time, flat-plate like molten resin material is extruded from the extruding nozzle 8 to a gap between the pressing roll 6 and molding roll 7. The flat plate-like substrate 11 is molded between the pressing roll 6 and molding roll 7, which rotate in opposite directions to each other. Then, the respective entangled yarns 14 are fused continuously in the molding direction to the first surface of the flat plate-like substrate 11. At this time, the concave portions 7c are filled with molten resin material so that semi-circular covered portions 11b covering the entangled yarns 14 locally are molded. After that, this product is cooled and hardened in water within the water bath 9 and carried to a next step.

The female engaging member 10 according to the fifth or sixth embodiment as shown in FIGS. 14 and 15 can be produced effectively by modifying the production apparatus for producing those of the first to third embodiments. To mold the female engaging member 10 of the fifth embodiment, the circular groove for guiding the entangled yarn 14 are formed in the peripheral direction in the peripheral face of the die wheel 1 and multiple groove portions crossing the aforementioned circular grooves and extending in the axial direction of the die wheel 1 are disposed in the peripheral face with a predetermined phase difference in the peripheral direction. Then, the entangled yarns 14 are guided into the circular grooves of the die wheel and molten resin material extruded from the extruding nozzle forms the flat plate-like substrate 11 between the extruding nozzle and the die wheel. At the same time, the molten resin material is charged into the groove portions so as to mold the elevated portion 11a. The elevated portions 11a are fused integrally with the entangled yarns 14 at the crossing portions between the circular grooves and groove portions so that the entangled yarns 14 are fixed to the flat plate-like substrate 11a. To mold the female engaging member 10 according to the sixth embodiment, a multiplicity of concave portions wider than the circular grooves are provided at a predetermined interval along the circular grooves instead of the aforementioned groove portions. The molten resin material is charged into the concave portions so as to mold the protrusions to be fused integrally with the entangled yarns 14.

Figure 19:
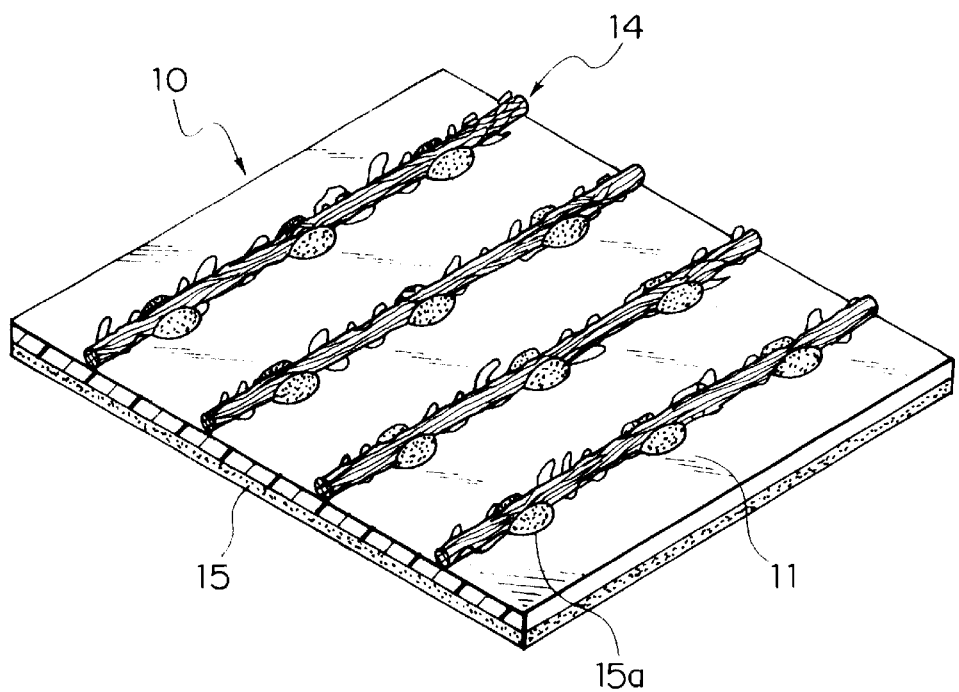
FIG. 19 is a schematic perspective view showing a seventh embodiment of the female engaging member of the surface fastener of the present invention.
Figure 20:
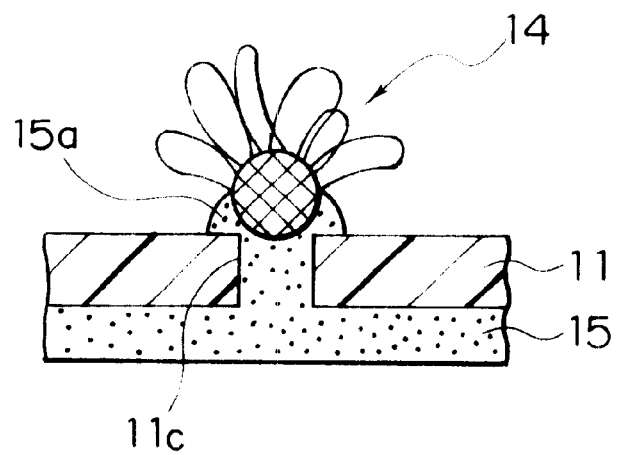
FIG. 20 is a partial sectional view showing a schematic structure of the female engaging member.

FIGS. 19 and 20 show a seventh embodiment of the female engaging member 10 of the present invention. Multiple entangled yarns 14 are fused in parallel to the first surface of the flat plate-like substrate 11 and adhesive agent is coated to the second surface of the substrate to form an adhesive agent layer 15. On the other hand, through holes 11c are formed at positions of the flat plate-like substrate to which the entangled yarn 14 are to be fused at a predetermined interval in a length direction thereof. Adhesive agent is forced through the through holes by a coating pressure when the adhesive agent layer 15 is formed so that it flows out to the first surface. Then, the adhesive agent is hardened so as to sandwich locally the entangled yarns 14 from their both sides. According to this embodiment, the entangled yarns 14 are fused to the first surface of the flat plate-like substrate 11 and covered locally by covering portions 15a of the adhesive agent. Thus, the fixing strength is increased largely as compared to a case where the entangled yarns 14 are just fused to the first surface of the flat plate-like substrate 11.

Figure 21:
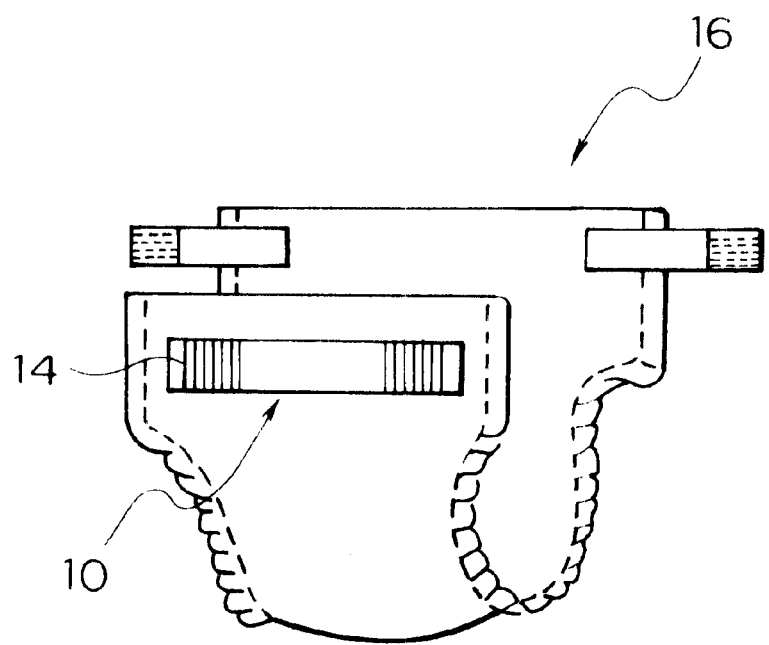
FIG. 21 is a perspective view showing a paper diaper to which the aforementioned female engaging member is applied.

The female engaging member 10 obtained according to the seventh embodiment can be optimally used as a fixing device of a paper diaper 16 shown in FIG. 21 or the like when the thickness of the flat plate-like substrate 11 is reduced.

What is claimed is:

1. A female engaging member of a surface fastener comprised of a flat plate-like substrate having a first surface and a second surface and a multiplicity of pile-like engaging elements on the first surface, and adapted to be in a plane contact with a mating male engaging member of the surface fastener, wherein said pile-like engaging elements are comprised of rows of multifilament entangled yarns having a multiplicity of loops on surfaces thereof, multiple rows of elevated portions made of the same material as said flat plate-like substrate are molded integrally so as to extend on the first surface of said flat plate-like substrate, and, said entangled yarns are fixed integrally to top faces of said elevated portions such that said entangled yarns are partially buried therein.

2. A female engaging member according to claim 1, wherein a multiplicity of the elevated portions which are parallel in a length direction thereof are provided on the first surface of said flat plate-like substrate and said entangled yarns extend along the top faces of said elevated portions and are locally pressed at a predetermined interval in the length direction so that the entangled yarns are fused integrally with said elevated portion.

3. A female engaging member according to claim 1, wherein a plurality of the elevated portions which are parallel in a length direction thereof are provided on the first surface of said flat plate-like substrate, and said entangled yarns are disposed on top faces of said elevated portions such that they meander and are pressed locally at crossing portions where said entangled yarns and said elevated portions so as to be fused integrally with said elevated portions.

4. A female engaging member of a surface fastener comprised of a flat plate-like substrate having a first surface and a second surface and a multiplicity of pile-like engaging elements on the first surface, and adapted to be in a plane contact with a mating male engaging member of the surface fastener, wherein said pile-like engaging elements are comprised of rows of multifilament entangled yarns having a multiplicity of loops on surfaces thereof, a multiplicity of parallel elevated portions are disposed on the first surface of said flat plate-like substrate in a width direction thereof, and said entangled yarns are disposed on said first surface perpendicular to said elevated portion and said entangled yarns are integrally fixed to said elevated portions at crossing portions therebetween.

5. A female engaging member of a surface fastener having a multiplicity of pile-like engaging elements on a first surface of a flat plate-like substrate and adapted to be in a plane contact with a mating engaging member of the surface fastener, wherein said pile-like engaging elements are comprised of multifilament entangled yarns having a multiplicity of loops on surfaces thereof, through holes are formed in said flat plate-like substrate in a matrix and a multiplicity of said entangled yarns are disposed along each row of the through holes arranged in a length direction of the first surface, and an adhesive agent layer is formed on a second surface on an opposite side to said first surface of said flat plate-like substrate so that component adhesive agent of the adhesive agent layer is fused integrally with said entangled yarns locally through said through holes.

6. A female engaging member according to claim 1, wherein said entangled yarns are composed of composite finished yarns processed by air jet and comprised of two or more multifilaments fed at different feeding speeds.

7. A female engaging member according to claim 1, wherein said entangled yarns are composed of bulky crimped finished yarns produced by air jet processing and made of bulky highly-crimped finished multifilaments.

8. A female engaging member according to claim 1, wherein the entangled yarns are composed of bulky thermal shrinkage yarns produced by air jet processing and made of two or more multifilaments having different thermal shrinkage rates.

9. A female engaging member according to claim 1, wherein male engaging elements are molded integrally on a second surface on an opposite side to the first surface of said flat plate-like substrate.

10. A female engaging member according to claim 1, wherein male engaging elements are molded integrally on the first surface of said flat plate-like substrate.

* * * * *